United States Patent
AlYousif et al.

(10) Patent No.: US 12,286,866 B2
(45) Date of Patent: Apr. 29, 2025

(54) METHOD FOR ENHANCED STORAGE OF CARBON DIOXIDE IN GEOLOGICAL FORMATIONS

(71) Applicant: SAUDI ARABIAN OIL COMPANY, Dhahran (SA)

(72) Inventors: Zuhair AlYousif, Saihat (SA); Subhash C. Ayirala, Dhahran (SA); Muhammad M. Almajid, Qatif (SA); Moataz Abu AlSaud, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 209 days.

(21) Appl. No.: 17/819,531

(22) Filed: Aug. 12, 2022

(65) Prior Publication Data
US 2024/0052726 A1    Feb. 15, 2024

(51) Int. Cl.
*E21B 41/00* (2006.01)
*B65G 5/00* (2006.01)

(52) U.S. Cl.
CPC ............ *E21B 41/0064* (2013.01); *B65G 5/00* (2013.01)

(58) Field of Classification Search
CPC ........ B65G 5/00; E21B 41/0064; Y02C 20/40
See application file for complete search history.

(56) References Cited

U.S. PATENT DOCUMENTS

| | | | |
|---|---|---|---|
| 8,048,309 B2 * | 11/2011 | Osegovic | C02F 1/26 423/220 |
| 2011/0014100 A1 * | 1/2011 | Bara | B01D 53/62 423/437.1 |
| 2011/0035154 A1 * | 2/2011 | Kendall | C04B 28/10 422/111 |
| 2015/0037231 A1 | 2/2015 | Seeker et al. | |
| 2015/0345259 A1 * | 12/2015 | Wang | B65G 5/00 166/305.1 |
| 2016/0121298 A1 * | 5/2016 | Constantz | B01J 20/3204 423/430 |
| 2021/0069669 A1 | 3/2021 | Constantz et al. | |
| 2021/0114892 A1 | 4/2021 | Trampe | |

(Continued)

FOREIGN PATENT DOCUMENTS

EP    1571105 B1    12/2007

OTHER PUBLICATIONS

Alfredsson, H. et al. "The geology and water chemistry of the Hellisheidi, SW—Iceland carbon storage site", International Journal of Greenhouse Gas Control, vol. 12, Jan. 1, 2013 (Jan. 1, 2013), pp. 399-418 (20 pages).

(Continued)

*Primary Examiner* — Carib A Oquendo
(74) *Attorney, Agent, or Firm* — Osha Bergman Watanabe & Burton LLP

(57) ABSTRACT

Described is a method for enhanced carbon dioxide ($CO_2$) sequestration in geological formations. The method includes dissolving $CO_2$ in a low salinity fluid to form a $CO_2$-brine solution. The low salinity fluid includes sodium ($Na^+$) ions and sulfate ($SO_4^{2-}$) ions. The $CO_2$-brine solution is injected into a geological formation, and the $CO_2$ reacts with the geological formation to produce solid carbonate minerals for $CO_2$ sequestration.

9 Claims, 3 Drawing Sheets

(56) References Cited

U.S. PATENT DOCUMENTS

2021/0356680 A1 11/2021 Constantz et al.
2023/0016334 A1* 1/2023 Chorn .................. E21B 43/305

OTHER PUBLICATIONS

Fattahi Mehraban, M. et al. "Functional compounds of crude oil during low salinity water injection", Fuel, IPC Sience and Technology Press, Guildford, GB, vol. 285, Sep. 16, 2020 (Sep. 16, 2020) (10 pages).
Chaturvedi, K. R. et al. "Impact of Low Salinity Water Injection on CO2 Storage and Oil Recovery for Improved CO2 Utilization", Chemical Engineering Science, Oxford, GB, vol. 229, Sep. 12, 2020 (13 pages).
Jha, N. K. et al. "Th CO2 07 Low Salinity Surfactant Nanofluids for Enhanced CO2 Storage Application at High Pressure and Temperature" Nov. 23, 2018 (4 pages).
International Search Report issued in International Application No. PCT/US2023/030060 dated Oct. 12, 2023 (4 pages).
Written Opinion issued in International Application No. PCT/US2023/030060 dated Oct. 12, 2023 (10 pages).
Flaathen, "Water-rock interaction during CO2 sequestration in basalt," Hydrology. Universite Paul Sabatier—Toulouse II, 2009, 165 pages.
Gislason et al., "Carbon storage in basalt," Science, 344, 373-374, 3 pages.
Kumar et al., "Effect of brine salinity on the geological sequestration of CO2 in a deep saline carbonate formation," https://doi.org/10.1002/ghg. 1960, 17 pages.
Lee et al., "Enhanced Wettability Modification and CO2 Solubility Effect by Carbonated Low Salinity Water Injection in Carbonate Reservoirs," Journal of Chemistry. vol. 2017 |Article ID 8142032, 11 pages.
Messabeb et al., "Experimental Measurements of CO2 Solubility in Aqueous CaCI2 Solution at Temperature from 323.15 to 423.15 K and Pressure up to 20 MPa Using the Conductometric Titration," J. Chem. Eng. Data 2017, 62, 12, 4228-4234, 7 pages.
Metz et al., "Carbon dioxide capture and storage: special report of the intergovernmental panel on climate change," Cambridge University Press, 2005, 443 pages.
Otheim et al., "CO2 Sequestration in Basalt: Carbonate Mineralization and Fluid Substitution," SEG San Antonio 2011 Annual Meeting, 2011, 6 pages.
Teklu et al., "Low-salinity water-alternating-CO2 EOR," Journal of Petroleum Science and Engineering, vol. 142, 2016, pp. 101-118, 18 pages.

* cited by examiner

| Ions | Symbol | HSW (ppm) | LSW1 (ppm) | LSW2 (ppm) | LSW3 (ppm) |
|---|---|---|---|---|---|
| Sodium | $Na^+$ | 18,300 | 1,865 | 1830 | 915 |
| Calcium | $Ca^{2+}$ | 650 | 0 | 65 | 32.5 |
| Magnesium | $Mg^{2+}$ | 2,110 | 0 | 211 | 105.5 |
| Sulfate | $SO_4^{2-}$ | 4,290 | 3,896 | 429 | 214.5 |
| Chloride | $Cl^-$ | 32,200 | 0 | 3220 | 1610 |
| Bicarbonate | $HCO_3^-$ | 120 | 0 | 12 | 6 |
| TDS | | 57,670 | 5,761 | 5,767 | 2,883 |

FIG. 2

| Pressure (psi) | CO₂ Solubility (Moles of CO₂/kg Brine) | |
|---|---|---|
| | HSW | LSW |
| 14.7 | 1.043E-5 | 1.320E-5 |
| 500 | 0.728 | 0.921 |
| 1000 | 1.123 | 1.421 |
| 2000 | 1.313 | 1.662 |
| 3000 | 1.51 | 1.911 |

METHOD FOR ENHANCED STORAGE OF CARBON DIOXIDE IN GEOLOGICAL FORMATIONS

Increasing carbon dioxide ($CO_2$) emissions poses significant challenges for many governments and industries. Reduction of $CO_2$ emissions may be approached through two main categories. One category is developing and expanding the utilization of resources that emit less $CO_2$. The second category is utilization of the already emitted $CO_2$ for permanent storage underground.

Carbon capture and storage (CCS) has emerged as a solution to counterbalance the greenhouse gas (GHG) emissions. During CCS, the $CO_2$ in the atmosphere is captured, compressed, transported, and eventually stored underground in geological formations. Geological formations include, but are not limited to, depleted oil and gas reservoirs, coal bed methane reservoirs, deep saline aquifers, and basaltic formations.

$CO_2$ can be sequestered in geologic formations by four principal mechanisms: structural/stratigraphic trapping, capillary/residual trapping, solubility trapping, and mineral trapping. Safe and secure storage of $CO_2$ is a requirement of this technology. The effectiveness of sequestering $CO_2$ into deep reservoirs depends on the reservoir's storage capacity, its stability, and its risk of leakage. Injecting $CO_2$ into porous basalt rocks has been identified as a process for safe and fast $CO_2$ storage. Storing $CO_2$ in basalts is beneficial compared to sequestering $CO_2$ into deep saline aquifers or depleted oil and gas reservoirs. The benefits are accomplished due to the rapid mineralization of $CO_2$ into carbonates in basalts relative to that in other formations.

$CO_2$ sequestration in basalts consists of capturing $CO_2$ by dissolving it in groundwater or seawater, followed by injecting the $CO_2$-rich water into basalts. Once dissolved in water, $CO_2$ is no longer buoyant. The acidity of $CO_2$-rich water accelerates metal release from Calcium (Ca)-Magnesium (Mg)-Iron (Fe) rich rocks, such as basalt, and formation of solid carbonate minerals. To enhance the efficiency of the mineralization process, $CO_2$ is co-injected with sufficient water downhole so that the gas is completely dissolved at the depth of its release into the target subsurface basalt.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for enhanced storage of carbon dioxide ($CO_2$) in geological formations. The method includes dissolving $CO_2$ in a low salinity fluid to form a $CO_2$-brine solution. The low salinity fluid includes sodium ($Na^+$) ions and sulfate ($SO_4^{2-}$) ions. The $CO_2$-brine solution is injected into a geological formation, and the $CO_2$ reacts with the geological formation to produce solid carbonate minerals for $CO_2$ sequestration.

Other aspects and advantages of the claimed subject matter will be apparent from the following description and the appended claims.

BRIEF DESCRIPTION OF DRAWINGS

FIG. 2 illustrates brine composition and salinity for a high salinity water (HSW) solution and three low salinity water (LSW) solutions according to some embodiments of the present disclosure.

DETAILED DESCRIPTION

In one aspect, embodiments disclosed herein relate to a method for enhanced storage of carbon dioxide (CO 2) in geological formations, such as reactive basaltic rocks (or basalt).

Basalt contains approximately 25% by weight of calcium (Ca), magnesium (Mg), and iron (Fe) oxides. Basalt is more reactive in water than sedimentary rocks. Therefore, the metals contained in basalts are readily available to combine with injected $CO_2$ to form carbonate minerals. As noted above, $CO_2$ is typically dissolved with sufficient water to maintain its solubility at downhole conditions (avoiding negative effects of $CO_2$ falling out of solution and becoming buoyant in the formation and $CO_2$ migration to the surface). This may result in an excess of water being used and a decrease in $CO_2$ sequestration efficiency.

Figure 1:
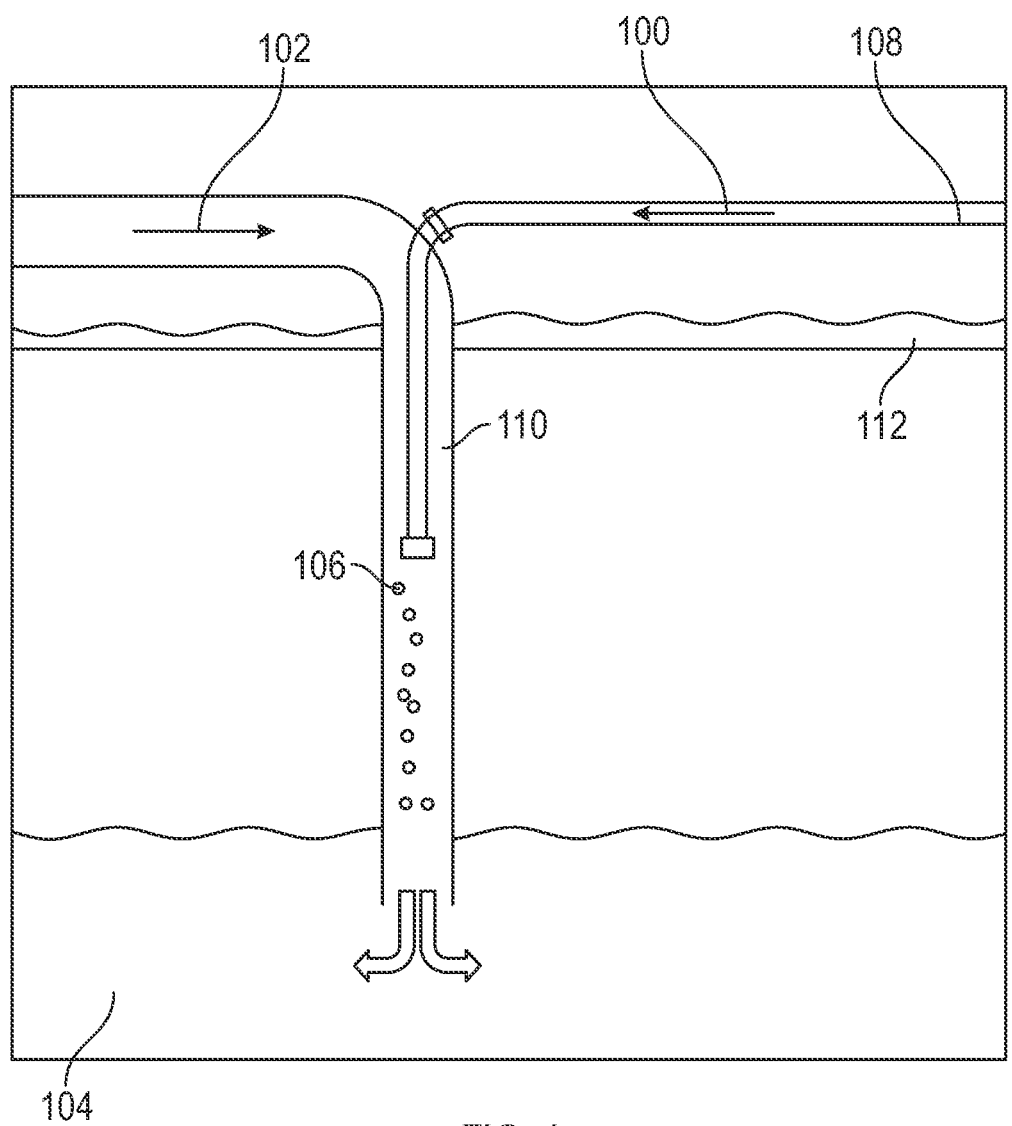
FIG. 1 illustrates injection of $CO_2$ and water into a geological formation in a $CO_2$ sequestration process according to some embodiments of the present disclosure.

As depicted in FIG. 1, $CO_2$ (100) that has been captured, compressed, and transported to a well in a geological formation may be dissolved into water (102) (e.g., groundwater, seawater) during its injection into the geological formation (104), such as basalt. $CO_2$ bubbles (106) may be released from a pipeline (108) at a predetermined depth (e.g., 350 meters) within an injection well (110) and into the water (102) flowing down into the injection well (110). The dissolved $CO_2$ will not migrate up to the surface (112), because the dissolved $CO_2$ is not buoyant. The $CO_2$ rich water may accelerate metal release from basalt. Therefore, formation of solid carbonate minerals may also be accelerated. The storage of the $CO_2$ as a mineral may immobilize the $CO_2$ in the geological formation (104). To enhance the efficiency of the mineralization process, $CO_2$ may be co-injected with a sufficient volume of fluid down the injection well (110), such that the $CO_2$ gas may be completely dissolved at the depth of its release into the target subsurface basalt. Increasing the amount of the dissolved $CO_2$ may enhance $CO_2$ storage in the geological formation (104).

The solubility of $CO_2$ in water is salinity dependent. As the salinity decreases, the $CO_2$ solubility increases. Additionally, $CO_2$ solubility in brine is a function of the total dissolved solids (TDS). TDS is a measure of the dissolved combined content of all inorganic and organic substances present in a liquid.

Different parameters can affect the mineralization process for $CO_2$ sequestration. As $CO_2$ dissolves in brine, it decomposes into $H^+$ and $HCO_3^-$. Mineralization of $CO_2$ into carbonate minerals occur from a combination of water-carbon dioxide mixtures and divalent metal cations ($Ca^{2+}$, $Mg^{2+}$, $Fe^{2+}$). These cations are present in formation waters but constitute dilute concentrations. Basaltic rocks, however, are rich in these cations and poor in silica. Additionally, basaltic rocks are comprised of minerals that contain these divalent metal cations at far-from-equilibrium states. A far-from-equilibrium state means that the reaction rates occur faster than normal because the ion activity product is far away from the equilibrium constant. This translates into high dissolution rates of these metals compared to other types of rocks.

Bicarbonate is naturally produced by the reaction of $CO_2$ with water ($H_2O$) The first step for this rock-fluid interaction is that carbonic acid ($H_2CO_3$) can dissociate into bicarbonate ($HCO_3^-$) and proton ($H^+$) ions, lowering the pH of water, as shown in equations (1) and (2) below.

$$CO_2 + H_2O \rightleftharpoons H_2CO_3 \quad (1)$$

$$H_2CO_3 \rightleftharpoons HCO_3^-(aq) + H^+(aq). \quad (2)$$

Divalent metal cations in the water may precipitate as carbonates $(Ca, Mg, Fe)CO_3$ as follows:

$$(Ca,Mg,Fe)^{2+}(aq) + H_2CO_3 \rightarrow (Ca,Mg,Fe)CO_3(s) + 2H^+(aq). \quad (3)$$

The reaction in equation (3) occurs if the hydrogen ions are consumed by another reaction. Equations (4) and (5) below present two non-limiting examples of minerals that are commonly present in reactive basalts, including forsterite ($Mg_2SiO_4$) and plagioclase ($CaAl_2Si_2O_8$). The consumption of the free hydrogen in the reactions releases new divalent metal cations into the water. The free cations then react with the $CO_2$-water mixture (see equation (3)) to precipitate as carbonates.

$$Mg_2SiO_4(s) + 4H^+(aq) \rightarrow 2Mg^{2+}(aq) + H_2O + SiO_2(aq) \quad (4)$$

$$CaAl_2Si_2O_8(s) + 8H^+(aq) \rightarrow Ca^{2+} + 2Al^{3+}(aq) + 4H_2O + 2SiO_2(aq) \quad (5)$$

Therefore, parameters that control the mineralization include presence of reactive minerals and formation of carbonic acid. Additionally, depth of the geological formation is another parameter. As depth increases, pressure increases and the $CO_2$ becomes dense. Eventually the solubility of $CO_2$ in brine is enhanced. Furthermore, temperature is another parameter that affects the mineralization process for $CO_2$ sequestration. The temperature enhances the reactivity, such that at high temperatures, $CO_2$ mineralizes faster.

In the past, various water chemistries (brines) have been used to maintain $CO_2$ solubility during injection into geological formations while promoting carbonate formation. There are various parameters to consider in maintaining $CO_2$ during injection downhole, such as temperature, pressure, and salt concentrations. It has been determined that a low salinity water (LSW) fluid, more specifically a sulfate containing LSW fluid, may be effective for controlling these factors while increasing $CO_2$ solubility. Sulfate, or sulfate plus additional aqueous ions, enhances CO2 solubility and may be effectively injected into and react with various basalt formations.

To enhance its solubility, $CO_2$ may be co-injected into basaltic formations with a low salinity brine fluid having specific aqueous ions according to one or more embodiments of the present disclosure. The low salinity brine fluid may act to increase the amount of the dissolved $CO_2$, reduce the volume of water used, and expedite mineralization for enhanced $CO_2$ storage. Furthermore, the formulation of the low salinity solution, such as the type of aqueous ions included and their amounts, may be adjusted based on the target basaltic formation and/or other conditions, as allowing for customization of the injection solution to enhance $CO_2$ sequestration.

As reported, the solubility of $CO_2$ is salinity dependent. As salinity decreases, solubility of $CO_2$ in water increases. Generally, $CO_2$ solubility in brine decreases as salinity increases due to the so-called "salting out" effect. Comparisons between different salinities reveal that $CO_2$ solubility decreases nearly 49% when the salinity increases from 0 to 4 mol aqueous NaCl solutions. Given the same temperature and pressure conditions, more $CO_2$ can be dissolved in low salinity water (LSW) solutions than high salinity water (HSW) solutions. Less water is needed when LSW is used for the same amount of $CO_2$ available and under the same temperature and pressure conditions. Therefore, the use of a LSW solution is advantageous in an environment with limited water resources and/or to reduce water usage. In addition, when more $CO_2$ is dissolved in water, the pH of the water decreases. A parameter that enhances the reactivity of carbonated water with rock minerals is the acidity of the water. As a result, it is expected that when more $CO_2$ is dissolved in water, reactivity and, thus, mineralization may be expedited.

The method according to embodiments of the present disclosure may accelerate formation of solid carbonate minerals compared to existing injection solutions with the use of a specific low salinity solution that increases $CO_2$ solubility. In other words, use of the low salinity solution may enhance the efficiency of the mineralization process for $CO_2$ sequestration.

EXAMPLES

Several brine solutions were used to evaluate the $CO_2$ solubility in experimental studies. The results of the studies are presented in the table in FIG. 2. The brine solutions evaluated include a high salinity water (HSW) solution and three low salinity water (LSW) solutions (LSW1, LSW2, LSW3). The table shows non-limiting examples of aqueous ions that may be utilized in preparing the LSW solution. As can be appreciated by one skilled in the art, other aqueous ions may also be used as additives to the LSW solution in addition to those listed in FIG. 2.

In one embodiment, the HSW solution contains water and the following ions: sodium ($Na^+$), calcium ($Ca^{2+}$), magnesium ($Mg^{2+}$), sulfate ($SO_4^{2-}$), chloride ($Cl^-$), and bicarbonate ($HCO_3^-$). LSW solution 1 includes only $Na^+$ and $HCO_3^-$ ions. LSW solution 2 and LSW solution 3 include a combination of $Na^+$, $HCO_3^-$, $Ca^{2+}$, $Mg^{2+}$, $SO_4^{2-}$, and $Cl^-$ in different amounts. The composition of the LSW solutions in FIG. 2 are provided only as examples and are not intended to limit the types or amounts of ions that may be utilized. As shown in FIG. 2, LSW solution 2 has a similar TDS value as LSW solution 1. The TDS value for LSW solution 3 is approximately 50% lower than the TDS of LSW solutions 1 and 2. Each of the LSW solutions presented in FIG. 2 has a TDS value significantly less than the TDS value of the HSW solution. (e.g., 57,670 parts per million (ppm) compared to 5,761 ppm).

In one or more embodiments, the salinity range for the LSW solution is 3,000 to 6,000 ppm TDS. In one or more embodiments, the range of aqueous ions that may be used in preparing the LSW is as follows: sodium ions: 1,000 to 2,000 ppm; calcium ions: 10 to 100 ppm; magnesium ions: 25 to 250 ppm; sulfate ions: 200 to 4,000 ppm, and chloride ions: 1,500 to 3,500 ppm.

As can be appreciated by one skilled in the art, different LSW solutions having different compositions may be implemented depending on the basaltic formation and conditions surrounding the formation. The conversion of $CO_2$ into carbonate minerals is related to the success of $CO_2$ storage in basaltic formations. As $CO_2$ dissolves in brine, it decomposes into H+ and $HCO_3^-$. Mineralization of $CO_2$ into carbonate minerals occurs from a combination of water-$CO_2$ mixtures and divalent metal cations (e.g., $Ca^{2+}$, $Mg^{2+}$, $Fe^{2+}$). These cations are present in formation waters but are present in dilute concentrations. One or more of these ions may be added in higher concentrations to enhance $CO_2$ mineralization.

Figures 3, 4:
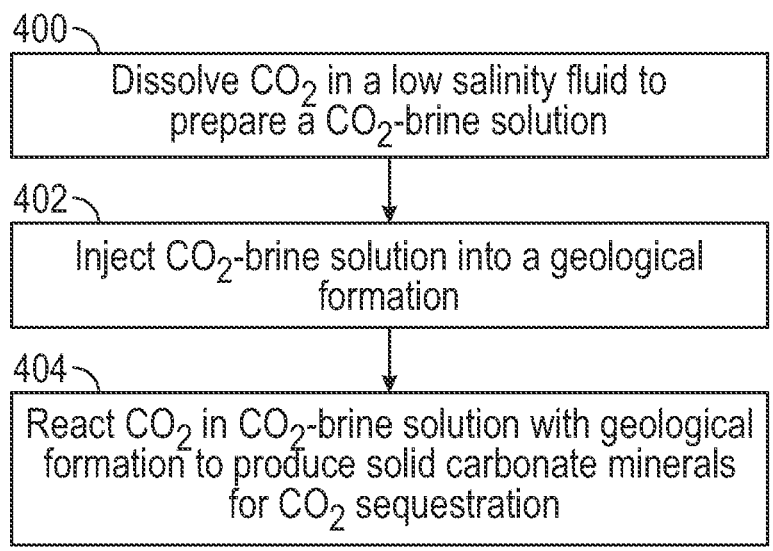
FIG. 3 illustrates solubility of $CO_2$ in a HSW solution compared to a LSW solution according to some embodiments of the present disclosure.
FIG. 4 illustrates a process for enhanced $CO_2$ sequestration in geological formations according to some embodiments of the present disclosure.

FIG. 3 is a table illustrating computed results from geochemical modeling of $CO_2$ solubility in brine when an LSW solution is used compared to a HSW solution. The table lists $CO_2$ solubility values (in moles of $CO_2$ per kilogram (kg) brine) for an example LSW solution (LSW1 in FIG. 2) and an example HSW solution obtained at different pressures (14.7 psi, 500 psi, 1000 psi, 2000 psi, and 3000 psi). Different pressures were used in the experimental studies to show how pressure significantly affects solubility of $CO_2$ in water. As pressure increases, density of $CO_2$ increases as well. The increase in $CO_2$ density decreases the difference between the water density and the $CO_2$ density. This decrease in the difference eventually reduces the surface tension between the water and the $CO_2$. As a result, more $CO_2$ is expected to be dissolved in water as pressure increases.

The results in FIG. 3 show an increase in $CO_2$ solubility in brine when the LSW solution is used compared to the HSW solution at all pressures tested. Specifically, the results show a 27% increase in $CO_2$ solubility when the LSW solution is used. Thus, by changing the salinity of the solution, the solubility of $CO_2$ may be improved.

In one or more embodiments, the LSW solution may be prepared by adding a desired amount of $Na_2SO_4$ salt to naturally available fresh water, such as lake water, river water, or reverse osmosis (RO) product water. For example, $Na_2SO_4$ salt may be added to and mixed with RO product water using specific mixing equipment at a facility near injection wells. Alternatively, shallow aquifer wells may be drilled, and groundwater may be produced and transported to the targeted field. In this embodiment, mixing may occur near the injection wells using specific mixing equipment and facility. Water may be transported via pipelines from any suitable water location to injection wells.

In addition, the LSW solution may be prepared by blending a small volume of sulfate-rich rejected stream (generated from the seawater treatment using nanofiltration) with fresh water. The sulfate ions precipitated from either seawater or produced water based on chemical precipitation methods may also be added to fresh water to prepare the LSW solution and subsequently dissolve larger volumes of $CO_2$ for injection into basaltic formations. The LSW solution may also be prepared by adding other ions, in any combination, to water as described below.

FIG. 4 is a flow diagram illustrating the method for enhanced $CO_2$ sequestration in geological formations, such as basalt, according to some embodiments of the present disclosure. In a step (400), a $CO_2$-brine solution is prepared by dissolving $CO_2$ in a low salinity fluid. For the purposes of this disclosure, the $CO_2$-brine solution and the LSW solution refer to the same solution. The $CO_2$-brine solution is injected into a geological formation, such as basaltic rock, in a step (402). The $CO_2$-brine solution may be mixed and prepared immediately before injection. In a step (404), the $CO_2$ in the $CO_2$-brine solution reacts with the geological formation to produce solid carbonate minerals.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for enhanced carbon dioxide ($CO_2$) sequestration in geological formations, the method comprising:
   dissolving $CO_2$ in a low salinity fluid to form a $CO_2$-brine solution;
   injecting the $CO_2$-brine solution into a geological formation; and
   reacting the $CO_2$ with the geological formation to produce solid carbonate minerals,
   wherein the low salinity fluid comprises sodium ($Na^+$) ions in a range of 900 to 2,000 parts per million (ppm), sulfate ($SO_4^{2-}$) ions in a range of 200 to 4,000 ppm, and a total dissolved solids (TDS) value in a range of 2,000 to 6,000 ppm.

2. The method according to claim 1, wherein the low salinity fluid further comprises calcium ($Ca^{2+}$) ions in a range of 0 to 100 ppm.

3. The method according to claim 2, wherein the low salinity fluid further comprises ($Mg^{2+}$) ions in a range of 0 to 250 ppm.

4. The method according to claim 3, wherein the low salinity fluid further comprises chloride ($Cl^+$) ions in a range of 0 to 3,500 ppm.

5. The method according to claim 1, wherein the low salinity fluid further comprises magnesium ($Mg^{2+}$) ions in a range of 0 to 250 ppm.

6. The method according to claim 1, wherein the low salinity fluid further comprises chloride ($Cl^-$) ions in a range of 0 to 3,500 ppm.

7. The method according to claim 1, wherein the geological formation is a basaltic formation.

8. The method according to claim 1, further comprising preparing the low salinity fluid with seawater.

9. The method according to claim 1, further comprising preparing the low salinity fluid with groundwater.

* * * * *